US012781013B2

(12) United States Patent
Kawakami et al.

(10) Patent No.: US 12,781,013 B2
(45) Date of Patent: Nov. 3, 2026

(54) THERMALLY EXPANDABLE MICROCAPSULES, EXPANDABLE MASTER BATCH AND FOAM MOLDED BODY

(71) Applicant: SEKISUI CHEMICAL CO., LTD., Osaka (JP)

(72) Inventors: Takeru Kawakami, Yamaguchi (JP); Tatsuya Matsukubo, Yamaguchi (JP); Yusaku Uchiyama, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 510 days.

(21) Appl. No.: 18/576,584

(22) PCT Filed: Aug. 3, 2022

(86) PCT No.: PCT/JP2022/029818
§ 371 (c)(1),
(2) Date: Jan. 4, 2024

(87) PCT Pub. No.: WO2023/013682
PCT Pub. Date: Feb. 9, 2023

(65) Prior Publication Data

US 2025/0002667 A1 Jan. 2, 2025

(30) Foreign Application Priority Data

Aug. 6, 2021 (JP) ................................ 2021-130096
Jan. 24, 2022 (JP) ................................ 2022-008513

(51) Int. Cl.

| | |
|---|---|
| ***C08J 9/20*** | (2006.01) |
| ***C08J 9/00*** | (2006.01) |
| ***C08J 9/16*** | (2006.01) |
| ***C08J 9/232*** | (2006.01) |

(52) U.S. Cl.
CPC ............... *C08J 9/20* (2013.01); *C08J 9/0061* (2013.01); *C08J 9/232* (2013.01); *C08J 2201/03* (2013.01); *C08J 2203/22* (2013.01); *C08J 2323/00* (2013.01); *C08J 2423/06* (2013.01)

(58) Field of Classification Search
CPC ... C08J 9/20; C08J 9/0061; C08J 9/232; C08J 2201/03; C08J 2203/22; C08J 2323/00; C08J 2423/06; C08J 3/22; C08J 9/14; C08J 9/32; C08J 3/226; B01J 13/185; B01J 13/18
See application file for complete search history.

(56) References Cited

U.S. PATENT DOCUMENTS

| | | | |
|---|---|---|---|
| 2011/0263746 | A1 | 10/2011 | Kawaguchi et al. |
| 2017/0008772 | A1 | 1/2017 | Ueda |
| 2022/0119614 | A1 | 4/2022 | Kawaguchi et al. |

FOREIGN PATENT DOCUMENTS

| | | | | |
|---|---|---|---|---|
| CN | 102203205 | | 9/2011 | |
| CN | 105722788 | | 6/2016 | |
| EP | 3 395 925 | | 10/2018 | |
| JP | 2002-320843 | | 11/2002 | |
| JP | 2004-323854 | | 11/2004 | |
| JP | 2004323854 A | * | 11/2004 | |
| JP | 2021-6625 | | 1/2021 | |
| WO | 2017/110201 | | 6/2017 | |
| WO | WO-2018012415 A1 | * | 1/2018 | ............ C09J 201/02 |
| WO | 2018/012415 | | 11/2018 | |
| WO | 2020/158613 | | 8/2020 | |
| WO | WO-2020158613 A1 | * | 8/2020 | .............. C08L 27/06 |

OTHER PUBLICATIONS

Advancell EM, Sekisui Specialty Chemicals, https://www.sekisui.co.jp/cs/products/1270513_25825.html, 2017, with English translation.
English language translation of International Search Report issued Oct. 18, 2022 in corresponding International (PCT) Patent Application No. PCT/JP2022/029818.
Overview of Equipment Awarded the Outstanding Energy-Saving Equipment Award, J-Global, 2010, vol. 2009, pp. 62-65, with English concise explanation.

* cited by examiner

*Primary Examiner* — K. Boyle
(74) *Attorney, Agent, or Firm* — Wenderoth, Lind & Ponack, L.L.P.

(57) ABSTRACT

The present invention provides a thermally expandable microcapsule from which a foam molded article that has a uniform surface, is less prone to surface unevenness, and has an excellently light weight can be produced. The present invention also provides a foamable masterbatch and a foam molded article each produced using the thermally expandable microcapsule. Provided is a thermally expandable microcapsule including: a shell; and a volatile expansion agent as a core agent encapsulated by the shell, the thermally expandable microcapsule satisfying D10/D50 of 0.6 or more and 1.0 or less and D99/D50 of 1.0 or more and 2.0 or less where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

8 Claims, No Drawings

THERMALLY EXPANDABLE MICROCAPSULES, EXPANDABLE MASTER BATCH AND FOAM MOLDED BODY

TECHNICAL FIELD

The present invention relates to a thermally expandable microcapsule, a foamable masterbatch and a foam molded article each produced using the thermally expandable microcapsule.

BACKGROUND ART

To reduce the weight and to increase the functionality of resin materials, resin materials have been foamed using foaming agents. Typical foaming agents include thermally expandable microcapsules and chemical foaming agents.

Thermally expandable microcapsules are used as design-imparting agents or weight-reducing agents in various applications. They are also used in foamable inks, wallpapers, and other coating materials for weight reduction.

A widely known thermally expandable microcapsule includes one which has a thermoplastic shell polymer filled with a volatile expansion agent that becomes gaseous at a temperature not higher than the softening point of the shell polymer.

For example, Patent Literature 1 discloses a microsphere including an outer shell and a foaming agent sealed in the outer shell, wherein the average particle size of the microsphere and the amount of the foaming agent are set to satisfy a predetermined relationship.

Patent Literature 2 discloses a resin composition containing a hollow particle and an organic base resin, wherein the volume proportion of the amount of air contained in the hollow particle is 30% or more of the whole hollow particle.

CITATION LIST

Patent Literature

Patent Literature 1: WO 2017/110201
Patent Literature 2: WO 2018/012415

SUMMARY OF INVENTION

Technical Problem

Conventional thermally expandable microcapsules, however, have an issue in uniformity after expansion. In particular, when thermally expandable microcapsules are used in a thin-layer foam molded article, the surface of the resulting foam molded article becomes rough unless the microcapsules are uniformly expanded, resulting in surface unevenness which significantly impairs the surface properties.

A low expansion ratio or a variation in the expansion ratio in the process of expanding thermally expandable microcapsules results in a product that is insufficient in terms of functionality such as light weight.

The present invention aims to provide a thermally expandable microcapsule from which a foam molded article that has a uniform surface, is less prone to surface unevenness, and has an excellently light weight can be produced.

The present invention also aims to provide a foamable masterbatch and a foam molded article each produced using the thermally expandable microcapsule.

Solution to Problem

The present disclosure (1) is a thermally expandable microcapsule including: a shell; and a volatile expansion agent as a core agent encapsulated by the shell, the thermally expandable microcapsule satisfying D10/D50 of 0.6 or more and 1.0 or less and D99/D50 of 1.0 or more and 2.0 or less where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

The present disclosure (2) is the thermally expandable microcapsule according to the present disclosure (1), wherein a volumetric ratio of D99 to D50 $[(D99)^3/(D50)^3]$ is 1.0 or more and 8.0 or less.

The present disclosure (3) is the thermally expandable microcapsule according to the present disclosure (1) or (2), wherein a value obtained by dividing a difference between D99 and D10 by D50 [(D99−D10)/D50] is 0 or more and 1.4 or less.

The present disclosure (4) is the thermally expandable microcapsule according to any one of the present disclosures (1) to (3), wherein D99 is 15 μm or larger and 80 μm or smaller.

The present disclosure (5) is the thermally expandable microcapsule according to any one of the present disclosures (1) to (4), wherein the shell contains a polymer of a monomer composition containing a nitrile monomer.

The present disclosure (6) is the thermally expandable microcapsule according to any one of the present disclosures (1) to (5), wherein a shell thickness ratio (minimum shell thickness/maximum shell thickness) is 0.4 or more.

The present disclosure (7) is a foamable masterbatch including: the thermally expandable microcapsule according to any one of the present disclosures (1) to (6); and a thermoplastic resin.

The present disclosure (8) is a foam molded article produced using the thermally expandable microcapsule according to any one of the present disclosures (1) to (6) or the foamable masterbatch according to the present disclosure (7).

The present invention will be described in detail below.

The thermally expandable microcapsule of the present invention includes a shell and a volatile expansion agent as a core agent encapsulated by the shell.

The shell constituting the thermally expandable microcapsule of the present invention preferably contains a polymer compound.

The polymer compound is preferably a polymer containing a unit derived from a nitrile monomer, preferably a polymer containing a unit derived from a nitrile monomer and a unit derived from a monomer having a carboxy group and/or a unit derived from a (meth)acrylic acid ester monomer.

The polymer compound is preferably a polymer of a monomer composition containing a nitrile monomer, and is preferably a polymer of a monomer composition containing a nitrile monomer and a carboxy group-containing monomer and/or a (meth)acrylic acid ester monomer.

Examples of the nitrile monomer include, but are not limited to, acrylonitrile, methacrylonitrile, α-chloroacrylonitrile, α-ethoxyacrylonitrile, fumaronitrile, and mixtures thereof. Particularly preferred among these are acrylonitrile and methacrylonitrile. These may be used alone or in combination of two or more thereof.

The lower limit of the amount of the nitrile monomer in the monomer composition is preferably 20% by weight, and the upper limit thereof is preferably 99% by weight. When the amount is 20% by weight or more, the shell can have increased gas barrier properties to improve the expansion ratio. When the amount is 99% by weight or less, heat resistance can be improved, and yellowing can be prevented. The lower limit is more preferably 30% by weight, and the upper limit is more preferably 98% by weight.

The carboxy group-containing monomer may be, for example, a C3-C8 radically polymerizable unsaturated carboxylic acid monomer having a carboxy group.

Specific examples thereof include: unsaturated dicarboxylic acids and anhydrides thereof; and unsaturated dicarboxylic acid monoesters and derivatives thereof. These may be used alone or in combination of two or more thereof.

Examples of the unsaturated dicarboxylic acids include unsaturated monocarboxylic acids such as acrylic acid, methacrylic acid, ethacrylic acid, crotonic acid, and cinnamic acid, maleic acid, itaconic acid, fumaric acid, citraconic acid, and chloromaleic acid.

Examples of the unsaturated dicarboxylic acid monoesters include monomethyl maleate, monoethyl maleate, monobutyl maleate, monomethyl fumarate, monoethyl fumarate, monomethyl itaconate, monoethyl itaconate, and monobutyl itaconate.

Particularly preferred among these are acrylic acid, methacrylic acid, maleic acid, maleic anhydride, and itaconic acid.

The lower limit of the amount of the carboxy group-containing monomer in the monomer composition is preferably 5% by weight, and the upper limit thereof is preferably 50% by weight. When the amount is 5% by weight or more, the maximum foaming temperature can be increased. When the amount is 50% by weight or less, the expansion ratio can be improved. The lower limit is more preferably 10% by weight, and the upper limit is more preferably 30% by weight.

The (meth)acrylic acid ester monomer is preferably a (meth)acrylate. Particularly preferred is an alkyl methacrylate such as methyl methacrylate, ethyl methacrylate, or n-butyl methacrylate or an alicyclic/aromatic ring-containing/heterocyclic ring-containing methacrylate such as cyclohexyl methacrylate, benzyl methacrylate, or isobornyl methacrylate.

The lower limit of the amount of the (meth)acrylic acid ester monomer in the monomer composition is preferably 0.1% by weight, and the upper limit thereof is preferably 25% by weight. When the amount of the (meth)acrylic acid ester monomer is 0.1% by weight or more, a composition containing the thermally expandable microcapsule can have improved dispersibility. When the amount is 25% by weight or less, the cell wall can have improved gas barrier properties to provide better thermal expandability. The lower limit of the amount of the (meth)acrylic acid ester monomer is more preferably 0.3% by weight, and the upper limit thereof is more preferably 22% by weight.

The monomer composition preferably contains a crosslinkable monomer having two or more double bonds in the molecule. The crosslinkable monomer serves as a crosslinking agent. When the monomer composition contains the crosslinkable monomer, shell strength can be enhanced, so that the cell wall is less likely to break in thermal expansion.

Examples of the crosslinkable monomer include monomers having two or more radically polymerizable double bonds. Specific examples thereof include divinyl benzene, di(meth)acrylates, and tri- or higher functional (meth)acrylates.

Examples of di(meth)acrylates include ethylene glycol di(meth)acrylate, diethylene glycol di(meth)acrylate, triethylene glycol di(meth)acrylate, propylene glycol di(meth) acrylate, and 1,4-butanediol di(meth)acrylate. Examples also include 1,6-hexanediol di(meth)acrylate, 1,9-nonanediol di(meth)acrylate, glycerol di(meth)acrylate, trimethylolpropane di(meth)acrylate, and dimethylol-tricyclodecane di(meth)acrylate. Di(meth)acrylate of polyethylene glycol having a weight average molecular weight of 200 to 600 may also be used.

Examples of trifunctional (meth)acrylates include trimethylolpropane tri(meth)acrylate, ethylene oxide-modified trimethylolpropane tri(meth)acrylate, pentaerythritol tri (meth)acrylate, and triallylformal tri(meth)acrylate. Examples of tetra- or higher functional (meth)acrylates include pentaerythritol tetra(meth)acrylate and dipentaerythritol hexa(meth)acrylate.

Of these, trifunctional (meth)acrylates such as trimethylolpropane tri(meth)acrylate and bifunctional (meth)acrylates such as polyethylene glycol provide relatively uniform crosslinking in a shell mainly containing acrylonitrile.

The lower limit of the amount of the crosslinkable monomer in the monomer composition is preferably 0.1% by weight, and the upper limit thereof is preferably 1.0% by weight. When the amount of the crosslinkable monomer is 0.1% by weight or more, the crosslinkable monomer can sufficiently exhibit the effect as a crosslinking agent. When the amount of the crosslinkable monomer is 1.0% by weight or less, the expansion ratio of the thermally expandable microcapsule can be improved. The lower limit of the amount of the crosslinkable monomer is more preferably 0.15% by weight, and the upper limit thereof is more preferably 0.9% by weight.

The monomer composition preferably contains a different monomer in addition to the nitrile monomer, the carboxy group-containing monomer, the (meth)acrylic acid ester monomer, and the crosslinkable monomer. When the monomer composition contains the different monomer, the thermally expandable microcapsule has good compatibility with a matrix resin such as a thermoplastic resin, so that a foam molded article formed using the thermally expandable microcapsule can have excellent appearance.

Examples of the different monomer also include vinyl monomers such as vinyl chloride, vinylidene chloride, vinyl acetate, and styrene. These may be used alone or in combination of two or more thereof.

The monomer composition may contain a thermosetting resin in addition to the nitrile monomer, the carboxy group-containing monomer, the (meth)acrylic acid ester monomer, the crosslinkable monomer, and the different monomer.

Examples of the thermosetting resin include epoxy resins, phenolic resins, melamine resins, urea resins, polyimide resins, and bismaleimide resins. Preferred among these are epoxy resins and phenolic resins.

Examples of the epoxy resins include, but are not limited to, bisphenol A epoxy resins, bisphenol F epoxy resins, phenol novolac epoxy resins, cresol novolac epoxy resins, dicyclopentadiene epoxy resins, and glycidylamine epoxy resins.

Examples of the phenolic resins include novolac phenolic resins, resol phenolic resins, and benzylic ether phenolic resins. Preferred among these are novolac phenolic resins.

The thermosetting resin preferably has, in the molecule, two or more functional groups that react with a carboxy group. The presence of two or more functional groups that react with a carboxy group can enhance the curability of the thermosetting resin. Particularly when the monomer composition contains a carboxy group-containing monomer, the carboxy group and the thermosetting resin can be more firmly bonded to each other due to the heat in thermal foaming, thus greatly improving the heat resistance and durability.

The thermosetting resin preferably does not have a radically polymerizable double bond.

Examples of the functional groups that react with a carboxy group include a glycidyl group, a phenol group, a methylol group, and an amino group. Preferred among these is a glycidyl group. The functional groups that react with a carboxy group may be of the same type or two or more types.

The lower limit of the amount of the thermosetting resin in the monomer composition is preferably 0.01% by weight, and the upper limit thereof is preferably 30% by weight.

When the amount of the thermosetting resin is 0.01% by weight or more, the compression resistance in thermal foaming can be improved. When the amount of the thermosetting resin is 30% by weight or less, the shell can have better gas barrier properties, which improve foaming properties. The lower limit is more preferably 0.1% by weight, and the upper limit is more preferably 15% by weight.

A polymerization initiator is added to the monomer composition to polymerize the monomers.

Examples of suitable polymerization initiators include dialkyl peroxides, diacyl peroxides, peroxy esters, peroxydicarbonates, and azo compounds.

Specific examples include: dialkyl peroxides such as methyl ethyl peroxide, di-t-butyl peroxide, and dicumyl peroxide; and diacyl peroxides such as isobutyl peroxide, benzoyl peroxide, 2,4-dichlorobenzoyl peroxide, and 3,5,5-trimethylhexanoyl peroxide.

Examples also include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, and 1,1,3,3-tetramethylbutyl peroxyneodecanoate.

Examples also include: peroxy esters such as cumyl peroxyneodecanoate and (α,α-bis-neodecanoylperoxy)diisopropylbenzene; bis(4-t-butylcyclohexyl)peroxydicarbonate; di-n-propyl-oxydicarbonate; and diisopropyl peroxydicarbonate.

Examples also include peroxydicarbonates such as di(2-ethylethylperoxy)dicarbonate, dimethoxybutyl peroxydicarbonate, and di(3-methyl-3-methoxybutylperoxy)dicarbonate.

Examples also include azo compounds such as 2,2'-azobisisobutyronitrile, 2,2'-azobis(4-methoxy-2,4-dimethylvaleronitrile, 2,2'-azobis(2,4-dimethylvaleronitrile), and 1,1'-azobis(1-cyclohexanecarbonitrile).

The lower limit of the weight average molecular weight of the polymer compound constituting the shell is preferably 100,000 and the upper limit thereof is preferably 2,000,000. When the weight average molecular weight is less than 100,000, the shell may have decreased strength. When the weight average molecular weight is more than 2,000,000, the shell may have too high strength, which may decrease the expansion ratio.

The shell may further contain additives such as a stabilizer, an ultraviolet absorber, an antioxidant, an antistatic agent, a flame retardant, a silane coupling agent, and a colorant, if necessary.

The thermally expandable microcapsule of the present invention includes a volatile expansion agent as a core agent encapsulated by the shell. The volatile expansion agent is a substance that becomes gaseous at a temperature not higher than the softening point of the polymer constituting the shell. The volatile expansion agent is preferably a low-boiling-point organic solvent.

Examples of the volatile expansion agent (core agent) include hydrocarbons having less than 8 carbon atoms, hydrocarbons having 8 or more carbon atoms, petroleum ether, chlorofluorocarbons, and tetraalkylsilanes.

Examples of hydrocarbons having less than 8 carbon atoms include ethane, ethylene, propane, propene, n-butane, isobutane, butene, isobutene, n-pentane, isopentane, neopentane, n-hexane, and heptane.

Examples of hydrocarbons having 8 or more carbon atoms include isooctane, octane, decane, isododecane, dodecane, and hexanedecane.

Examples of chlorofluorocarbons include $CCl_3F$, $CCl_2F2$, $CClF_3$, and $CClF_2$—$CClF_2$. Examples of tetraalkylsilanes include tetramethylsilane, trimethylethylsilane, trimethylisopropylsilane, and trimethyl-n-propylsilane. Preferred among these are isobutane, n-butane, n-pentane, isopentane, n-hexane, and mixtures thereof. These volatile expansion agents may be used in combination of two or more thereof.

In the present invention, a hydrocarbon having less than 8 carbon atoms and a hydrocarbon having 8 or more carbon atoms may be used in combination. For example, a combination of pentane and isooctane is preferably used.

The volatile expansion agent may be a heat-decomposable compound that is heat-decomposable into a gaseous form by heat.

The amount of the core agent in the thermally expandable microcapsule is preferably 15 to 30% by weight. The amount of the core agent within the above range allows the thermally expandable microcapsule to have a better expansion ratio while having excellent durability against shearing during molding. The lower limit of the amount of the core agent is more preferably 18% by weight and the upper limit thereof is more preferably 24% by weight.

The lower limit of the foaming starting temperature (Ts) of the thermally expandable microcapsule of the present invention is preferably 110° C. and the upper limit thereof is preferably 250° C. The foaming starting temperature within the above range can prevent troubles in injection molding, particularly in core-back foam molding in which a mold is fully filled with a resin material and then opened enough to achieve a desired foam size. The troubles specifically include a decrease in the resin temperature during the core-back foaming process, which does not allow the expansion ratio to increase. The lower limit is more preferably 120° C. and the upper limit is more preferably 180° C.

The lower limit of the maximum foaming temperature (Tmax) of the thermally expandable microcapsule of the present invention is preferably 130° C. and the upper limit thereof is preferably 270° C. A maximum foaming temperature within the above range can lead to high heat resistance, so that breaking or shrinking of the thermally expandable microcapsules can be prevented in a high temperature range or during molding. Moreover, foaming due to shearing does not occur during the production of masterbatch pellets, and unfoamed masterbatch pellets can be produced stably. The lower limit is more preferably 150° C., still more preferably 160° C. and the upper limit is more preferably 230° C., still more preferably 225° C.

The maximum foaming temperature as used herein means a temperature at which the thermally expandable microcapsule reaches its maximum diameter (maximum displacement) when the diameter is measured while the thermally expandable microcapsule is heated from room temperature.

The lower limit of the maximum displacement (Dmax) of the thermally expandable microcapsule of the present invention is preferably 300 μm and the upper limit thereof is preferably 2,000 μm. The thermally expandable microcapsule having a maximum displacement within the above range can have an appropriate expansion ratio to achieve desired foamability.

The thermally expandable microcapsule of the present invention satisfies D10/D50 of 0.6 or more and 1.0 or less where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

When the "D10/D50" is 0.6 or more, the proportion of fine powder contained in the thermally expandable microcapsules can be reduced, increasing the foamability.

The lower limit of the "D10/D50" is preferably 0.62, more preferably 0.63, still more preferably 0.65 and the upper limit thereof is preferably 1.0 and may be, for example, 0.9 or less.

The thermally expandable microcapsule of the present invention satisfies D99/D50 of 1.0 or more and 2.0 or less where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

The closer the "D99/D50" is to 1.0, the better. When the "D99/D50" is 2.0 or less, the proportion of coarse particles contained in the thermally expandable microcapsules can be reduced, and the surface of the molded article formed using the thermally expandable microcapsules can be smooth.

The upper limit of the "D99/D50" is preferably 2.0, more preferably 1.9, still more preferably 1.8, even more preferably 1.75 and the lower limit thereof is preferably 1.2 and may be, for example, 1.3 or larger.

The "D10/D50" and "D99/D50" are calculated from the particle size based on the cumulative frequency and is different in terms of the meaning of the numerical value and the calculation method from the CV value (standard deviation/average value) which is a general index of variation.

Moreover, the term "D50" refers to a particle size based on a cumulative frequency of 50% by volume, and is different from the average particle size (arithmetic mean value of particle sizes) usually used. Since thermally expandable microcapsules are granulated by a method such as suspension polymerization, there is generally a difference between "D50" and "average particle size."

In the present invention, "D99", not "D90", is used. Therefore, it can be used as a standard for obtaining the effects of the present invention rather than as a mere measure of variation.

The thermally expandable microcapsule of the present invention preferably has a volumetric ratio of D99 to D50 $[(D99)^3/(D50)^3]$ of 1.0 or more, where D50 represents a particle size at a cumulative frequency of 50% by volume and D99 represents a particle size at a cumulative frequency of 99% by volume in a cumulative undersize distribution of a volume-equivalent particle size determined using a laser diffraction/scattering particle size distribution analyzer. The volumetric ratio of D99 to D50 is, for example, 2 or more and is preferably 8.0 or less, more preferably 7.5 or less, still more preferably 7.0 or less.

When the "$(D99)^3/(D50)^3$" is equal to or less than the upper limit, the molded article formed using the thermally expandable microcapsules can have a smoother surface.

The thermally expandable microcapsule of the present invention satisfies a value obtained by dividing a difference between D99 and D10 by D50 [(D99−D10)/D50] of preferably 0 or more, for example, 0.5 or more, and preferably 1.4 or less, more preferably 1.3 or less, still more preferably 1.2 or less, where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

When the "(D99−D10)/D50" is equal to or less than the upper limit, the molded article formed using the thermally expandable microcapsule can have a smoother surface.

The lower limit of D10 of the thermally expandable microcapsule of the present invention is preferably 1.0 μm, more preferably 5.0 μm, still more preferably 8.0 μm and the upper limit thereof is preferably 40 μm, more preferably 30 μm, still more preferably 25 μm. When D10 is equal to or larger than the lower limit, good foamability can be achieved. When D10 is equal to or smaller than the upper limit, the resulting molded article can have good surface properties.

The lower limit of D50 of the thermally expandable microcapsule of the present invention is preferably 5 μm, more preferably 8 μm, still more preferably 10 μm. The upper limit thereof is preferably 60 μm, more preferably 50 μm, still more preferably 40 μm, even more preferably 30 μm. When D50 is equal to or larger than the lower limit, good foamability can be achieved. When D50 is equal to or smaller than the upper limit, good surface properties can be achieved.

The lower limit of D99 of the thermally expandable microcapsule of the present invention is preferably 10 μm, more preferably 15 μm, still more preferably 20 μm and the upper limit thereof is preferably 80 μm, more preferably 70 μm, still more preferably 60 μm. When D99 is equal to or larger than the lower limit, good foamability can be achieved. When D99 is equal to or smaller than the upper limit, good surface properties can be achieved.

The term "D10" in the present invention refers to a particle size at which the cumulative frequency of distribution from the small particle side reaches 10% by volume in the cumulative undersize distribution of a volume-equivalent particle size determined using a laser diffraction/scattering particle size distribution analyzer. Similarly, the term "D50" refers to a particle size at which the cumulative frequency of distribution reaches 50% by volume and the term "D99" refers to a particle size at which the cumulative frequency of distribution reaches 99% by volume. D10, D50, and D99 can be measured using, for example, a laser diffraction/scattering particle size distribution analyzer (LA-950, available from Horiba, Ltd.).

In the thermally expandable microcapsule of the present invention, the lower limit of the shell thickness ratio (minimum shell thickness/maximum shell thickness) is preferably 0.3, more preferably 0.4 and the upper limit thereof is preferably 1.0, more preferably 0.9. When the thermally expandable microcapsule has a shell thickness ratio within the above range, better foamability can be achieved because gas generated from the volatile expansion agent during foaming is less likely to escape from the capsule.

The shell thickness ratio can be determined by observing the cross section of the thermally expandable microcapsule with an SEM or the like and calculating the minimum shell thickness/maximum shell thickness. The lower limit of the intermediate shell thickness [(maximum shell thickness+minimum shell thickness)/2] of the thermally expandable microcapsule of the present invention is preferably 1 μm, more preferably 2 μm and the upper limit thereof is preferably 10 μm, more preferably 6 μm. The "intermediate shell thickness" can be calculated from the "maximum shell thickness" and the "minimum shell thickness" measured for the "shell thickness ratio".

The method of producing the thermally expandable microcapsule of the present invention is not limited. For example, the thermally expandable microcapsule may be produced through the steps of: preparing an aqueous medium; dispersing, in the aqueous medium, an oily mixture liquid containing the volatile expansion agent and the monomer composition that contains the nitrile monomer, the carboxy group-containing monomer, the crosslinkable monomer, and the different monomer; and polymerizing the monomers.

In the present invention, the thermally expandable microcapsule having "D10/D50", "D99/D50", "$[(D99)^3/(D50)^3]$", "[(D99−D10)/D50]", "D10", "D50", "D99", a "shell thickness ratio", and an "intermediate shell thickness" each within the predetermined range can be produced not only by adjusting the compositions and amounts added of the materials used but also by adjusting the dispersing step, polymerization step, and classification step.

To produce the thermally expandable microcapsule of the present invention, first, the step of preparing an aqueous medium is performed. Specifically, for example, water, a dispersion stabilizer, and optionally an auxiliary stabilizer are put into a polymerization reaction vessel to prepare an aqueous dispersion medium containing a dispersion stabilizer. If necessary, alkali metal nitrite, stannous chloride, stannic chloride, potassium dichromate, or the like may be added.

Examples of the dispersion stabilizer include silica such as colloidal silica, calcium phosphate, magnesium hydroxide, aluminum hydroxide, ferric hydroxide, barium sulfate, calcium sulfate, sodium sulfate, calcium oxalate, calcium carbonate, barium carbonate, and magnesium carbonate.

The amount of the dispersion stabilizer added is not limited and is appropriately determined according to the type of the dispersion stabilizer, the particle size of the microcapsule, etc. The lower limit of the amount relative to 100 parts by weight of the monomers is preferably 0.1 parts by weight and the upper limit thereof is preferably 20 parts by weight.

Examples of the auxiliary stabilizer include condensation products of diethanolamine and aliphatic dicarboxylic acids and condensation products of urea and formaldehyde. Examples also include water-soluble nitrogen-containing compounds, polyethylene oxide, polyethyleneimine, tetramethylammonium hydroxide, gelatin, methylcellulose, polyvinyl alcohol, dioctyl sulfosuccinate, sorbitan esters, and emulsifiers.

Examples of the water-soluble nitrogen-containing compound include polyvinylpyrrolidone, polyethyleneimine, polyoxyethylenealkylamine, and polydialkylaminoalkyl (meth)acrylates typified by polydimethylaminoethyl methacrylate and polydimethylaminoethyl acrylate. Examples also include polydialkylaminoalkyl(meth)acrylamides typified by polydimethylaminopropylacrylamide and polydimethylaminopropylmethacrylamide, polyacrylamide, cationic polyacrylamide, polyamine sulfone, and polyallylamine. Preferred among these is polyvinylpyrrolidone.

Examples of the combination of the dispersion stabilizer and the auxiliary stabilizer include, but are not limited to, a combination of colloidal silica and a condensation product, a combination of colloidal silica and a water-soluble nitrogen-containing compound, and a combination of magnesium hydroxide or calcium phosphate and an emulsifier. Preferred among these is a combination of colloidal silica and a condensation product.

The condensation product is preferably a condensation product of diethanolamine and an aliphatic dicarboxylic acid, particularly preferably a condensation product of diethanolamine and adipic acid or a condensation product of diethanolamine and itaconic acid.

The amount of colloidal silica to be added is appropriately determined according to the particle size of the thermally expandable microcapsule. The lower limit is preferably 1 part by weight and the upper limit is preferably 10 parts by weight relative to 100 parts by weight of the oil phase. The lower limit is more preferably 2 parts by weight and the upper limit is more preferably 5 parts by weight. The amount of the condensation product or the water-soluble nitrogen-containing compound is appropriately determined according to the particle size of the thermally expandable microcapsule. The lower limit of the amount relative to 100 parts by weight of the oil phase is preferably 0.05 parts by weight and the upper limit thereof is preferably 1 part by weight.

In addition to the dispersion stabilizer and the auxiliary stabilizer, an inorganic salt such as sodium chloride or sodium sulfate may be added. Addition of an inorganic salt allows the thermally expandable microcapsule to have a more uniform particle shape. The amount of the inorganic salt added is usually preferably 0 to 100 parts by weight relative to 100 parts by weight of the monomers.

The aqueous dispersion medium containing the dispersion stabilizer is prepared by mixing the dispersion stabilizer and the auxiliary stabilizer in deionized water. The pH of the aqueous phase at this time is appropriately determined according to the types of the dispersion stabilizer and the auxiliary stabilizer used. For example, when the dispersion stabilizer used is a silica such as colloidal silica, an acidic medium is used for polymerization. The aqueous medium may be made acidic by optionally adding an acid such as hydrochloric acid to adjust the system to a pH of 3 to 4. When the dispersion stabilizer used is magnesium hydroxide or calcium phosphate, an alkaline medium is used for polymerization.

In the method of producing the thermally expandable microcapsule, next, the step of dispersing, in the aqueous medium, an oily mixture liquid containing the volatile expansion agent and the monomer composition that contains the nitrile monomer, the carboxy group-containing monomer, the crosslinkable monomer, and the different monomer is performed. In this step, the monomer composition and the volatile expansion agent may be separately added to the aqueous dispersion medium to prepare the oily mixture liquid in the aqueous dispersion medium. Typically, however, they are mixed in advance to form the oily mixture liquid, and the obtained oily mixture liquid is added to the aqueous dispersion medium. In this case, the oily mixture liquid and the aqueous dispersion medium may be prepared in separate containers in advance, mixed in another container with stirring to disperse the oily mixture liquid in the aqueous dispersion medium, and then added to the polymerization reaction vessel.

The monomers are polymerized using a polymerization initiator. The polymerization initiator may be added to the oily mixture liquid in advance, or may be added after the aqueous dispersion medium and the oily mixture liquid are mixed with stirring in the polymerization reaction vessel.

The monomer composition contains a polymerization initiator for polymerizing the monomers.

Examples of suitable polymerization initiators include dialkyl peroxides, diacyl peroxides, peroxy esters, peroxydicarbonates, and azo compounds. Specific examples include: dialkyl peroxides such as methyl ethyl peroxide, di-t-butyl peroxide, and dicumyl peroxide; diacyl peroxides such as isobutyl peroxide, benzoyl peroxide, 2,4-dichlorobenzoyl peroxide, and 3,5,5-trimethylhexanoyl peroxide; peroxy esters such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and (α,α-bis-neodecanoylperoxy)diisopropylbenzene; peroxydicarbonates such as bis(4-t-butylcyclohexyl)peroxydicarbonate, di-n-propyl-oxydicarbonate, diisopropylperoxydicarbonate, di(2-ethylethylperoxy)dicarbonate, dimethoxybutyl peroxydicarbonate, and di(3-methyl-3-methoxybutylperoxy)dicarbonate; and azo compounds such as 2,2'-azobisisobutyronitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

For preferential polymerization of acrylonitrile, t-butyl peroxypivalate or 2,2'-azobisisobutyronitrile is preferably used as a polymerization initiator in the present invention. Use of such a polymerization initiator can increase the proportion of polyacrylonitrile having high plasticizer resistance compared to the proportion of polymethacrylonitrile.

The oily mixture liquid may be dispersed in the aqueous dispersion medium by, for example, a method including stirring with a homogenizer (e.g., product of Tokushu Kika Kogyo Co., Ltd.), or a method including passing the oily mixture liquid and the aqueous dispersion medium through a static dispersion apparatus such as a line mixer or an element block-type static dispersion machine (static mixer).

Here, the aqueous dispersion medium and the polymerizable mixture may be separately fed to the static dispersion apparatus, or a dispersion obtained by mixing and stirring them in advance may be fed to the dispersion apparatus.

In the present invention, in the step of dispersing the oily mixture liquid containing the monomer composition and the volatile expansion agent in the aqueous medium, the oily mixture liquid is particularly preferably dispersed using an element block-type static dispersion machine (hereafter, also simply referred to as a block-type static dispersion machine).

In the conventional suspension polymerization by stirring and mixing using a stirring blade or a batch-type high-speed rotation high-shear dispersion machine, the mixing may be locally not uniform, which undesirably leads to production of thermally expandable microcapsules containing coarse particles. Polymerization of the monomers in the form of droplets, which are obtainable using the block-type static dispersion machine that has an adjusted pore size and is operated at an adjusted flow rate, can provide thermally expandable microcapsules containing less coarse particles and less fine powder.

When the block-type static dispersion machine is used for dispersion, the oily mixture liquid and the aqueous dispersion medium are preferably prepared in advance in separate containers and mixed to prepare a primary dispersion. Then, the primary dispersion is preferably fed to the block-type static dispersion machine under pressure.

The block-type static dispersion machine (static mixer) includes multiple sheet blocks, each having many holes, mounted in a tube with both ends open. The sheet blocks are placed on top of each other such that in at least one set of adjacent sheet blocks, the centers of the holes of the adjacent sheet blocks are not aligned with each other but the openings of the holes at least partially face each other.

When the block-type static dispersion machine is used for dispersion, it is preferable to set the number of blocks, the number of holes present in the blocks (the number of block holes), and the block hole size, in addition to the flow rate.

The flow rate in use of the block-type static dispersion machine is preferably 50 to 200 L/min.

The number of blocks is preferably 10 or more and 20 or less.

The block hole size is preferably 1 mm or larger and 3 mm or smaller.

The number of block holes is preferably 65 or more and 85 or less.

When the homogenizer is used for dispersion, the rotation speed is preferably 6,000 rpm or more and 12,000 rpm or less, more preferably 8,000 rpm or more and 10,000 rpm or less. The stirring time is preferably 5 minutes or longer and 60 minutes or shorter, more preferably 6 minutes or longer and 25 minutes or shorter.

When the homogenizer is used for dispersion, the later-described classification step is preferably carried out together.

The thermally expandable microcapsules of the present invention can be produced by performing, for example, the step of polymerizing the monomers by heating the dispersion obtained through the above steps.

The polymerization temperature is preferably 50° C. to 90° C. The polymerization temperature may be constant during the polymerization or may be increased stepwise in multiple times.

The polymerization pressure is preferably 0.5 to 1.0 MPa under pressurization with nitrogen. Before the polymerization pressure is set to the above, nitrogen purging or vacuum operation is preferably performed.

In preparation of the thermally expandable microcapsule of the present invention, a classification step may be performed after the above steps.

The classification step may include, for example, sieve classification using a classifier such as a vibrating sieve classifier, an electromagnetic vibration classifier, a sonic classifier, or a JIS standard sieve, as well as dry classification (wind classification), wet classification, or the like.

The dry classification (wind classification) refers to a method of classifying particles using an air flow.

Exemplary methods of the wind classification include a method in which particles are introduced into an airflow and collided with a screen for classification into particles that pass through the mesh of the screen and particles that do not pass the mesh, and a method in which particles are introduced into a swirling airflow and are classified into two groups of large and small particle sizes by interaction between the centrifugal force given by the swirling airflow and the flow of the airflow toward the swirling center (centrifugal classification). Exemplary methods also include gravity classification and inertia classification.

A usable wind classifier for the wind classification is, for example, a free vortex centrifugal classifier, a forced vortex centrifugal classifier, a gravity classifier, or an inertial classifier.

Examples of the wet classification includes gravity classification (classification based on the sedimentation velocity difference in a liquid), hydraulic classification (classification using a water flow added in the direction opposite to the sedimentation direction of the particles), and centrifugal classification (classification using sedimentation velocity difference in the centrifugal field).

The present invention also encompasses a foamable masterbatch containing the thermally expandable microcapsule of the present invention and a thermoplastic resin (base resin).

The base resin may be any thermoplastic resin and may be a thermoplastic resin used in typical foam molding. Specific examples of the thermoplastic resin include polyolefins such as low-density polyethylene (LDPE) and polypropylene (PP), ethylene-vinyl acetate copolymers (EVA), vinyl chloride, polystyrene, thermoplastic elastomers, and ethylene-methyl methacrylate copolymers (EMMA).

Examples of the thermoplastic elastomers include a styrene thermoplastic elastomer (abbreviated as SBC; hereinafter, abbreviated symbols are shown in parentheses), a thermoplastic olefinic elastomer (TPO), an olefin-based thermoplastic vulcanizate (TPV), a thermoplastic polyurethane (TPU), a thermoplastic polyester elastomer (TPEE), and a thermoplastic amide elastomer (TPAE).

Examples of the styrene thermoplastic elastomer include a styrene-isobutylene block copolymer (SIB), a styrene-isobutylene-styrene block copolymer (SIBS), a styrene-isoprene-styrene block copolymer (SIS), a styrene-butadiene-styrene block copolymer (SBS), a styrene-butadiene/butylene-styrene block copolymer (SBBS), a styrene-ethylene/propylene-styrene block copolymer (SEPS), a styrene-ethylene/butene-styrene block copolymer (SEBS), and a styrene-ethylene/ethylene/propylene-styrene block copolymer (SEEPS).

Preferred among these are an olefin-based thermoplastic vulcanizate (TPV) and a styrene-butadiene-styrene block copolymer (SBS).

The foamable masterbatch may contain any amount of the thermally expandable microcapsule. The lower limit of the amount relative to 100 parts by weight of the thermoplastic resin is preferably 10 parts by weight and the upper limit thereof is preferably 90 parts by weight.

The method of producing the foamable masterbatch is not limited. For example, the following method may be used. Raw materials such as the base resin (e.g., thermoplastic resin) and additives are kneaded in advance in a co-rotating twin screw extruder or the like. Subsequently, they are heated to a predetermined temperature, and a foaming agent such as the thermally expandable microcapsule is added, followed by further kneading. The resulting kneaded product is cut into pellets having a desired size using a pelletizer to form a masterbatch. Alternatively, raw materials such as the base resin (e.g., thermoplastic resin) and the thermally expandable microcapsule may be kneaded in a batch-type kneader and then granulated in a granulator to form a pelletized masterbatch.

The kneader may be any kneader capable of kneading the raw materials without breaking thermally expandable microcapsules. Examples thereof include a pressure kneader and a Banbury mixer.

The present invention also encompasses a foam molded article produced using the thermally expandable microcapsule or the foamable masterbatch of the present invention. In particular, the thermally expandable microcapsule of the present invention provides excellent surface properties can provide a foam sheet with high appearance quality, such as one having protrusions and depressions, and such a foam sheet is suitably used in applications such as housing wallpaper.

Specifically, the foam molded article can be obtained by kneading the thermally expandable microcapsule of the present invention or the foamable masterbatch containing the thermally expandable microcapsule of the present invention with a matrix resin and molding the kneaded product.

The method of molding the foam molded article is not limited. Examples thereof include knead molding, calender molding, extrusion molding, and injection molding. The injection molding may be performed by any method. Examples of the method include a short shot method, in which part of a resin material is placed in a mold and foamed, and a core back method, in which a mold is fully filled with a resin material and then opened enough to achieve a desired foam size.

As the matrix resin, any of those exemplified for the base resin can be used.

The thermally expandable microcapsule, the foamable masterbatch, and the foam molded article of the present invention are, for example in the above-described embodiments, advantageously used for automotive interior materials such as door trims and instrument panels, automotive exterior materials such as bumpers, building applications such as wallpaper and wood plastic composites, shoe soles, artificial cork, and like applications. Examples of the applications also include coating materials and adhesives. Examples further include thermal release tapes and the like used in the semiconductor field.

Advantageous Effects of Invention

The present invention can provide a thermally expandable microcapsule from which a foam molded article having a uniform surface and an excellently light weight can be produced.

The present invention can also provide a foamable masterbatch and a foam molded article each produced using the thermally expandable microcapsule.

When a foam thin film with a thickness of about 0.5 mm is formed, the problem of surface roughness is more likely to occur than the problem of foamability. In contrast, when a foam molded article with a thickness of about 3 mm is formed, the problem of foamability is more significant than the problem of surface roughness. The thermally expandable microcapsule of the present invention can improve both the problem of surface roughness and the problem of foamability, and can be used regardless of the thickness of the resulting molded article.

Moreover, the present invention can improve not only the uniformity of the surface shape but also the unevenness of the surface.

DESCRIPTION OF EMBODIMENTS

Embodiments of the present invention are more specifically described in the following with reference to, but not limited to, examples.

(Preparation of Composition 1 [Aqueous Dispersion Medium, Oily Mixture])

To 2,000 g of ion-exchanged water were added 300 g of colloidal silica having a solid content of 20% by weight, 7 g of polyvinylpyrrolidone, and 600 g of sodium chloride, followed by mixing and adjustment of the pH of the mixture to 3.5. Thus, an aqueous dispersion medium was prepared. An amount of 160 g of acrylonitrile, 180 g of methacrylonitrile, 250 g of methacrylic acid, 160 g of methyl methacrylate, and 6 g of trimethylolpropane trimethacrylate were mixed to obtain a monomer composition in the form of a uniform solution. To the monomer composition were added 10 g of 2,2'-azobisisobutyronitrile, 200 g of n-pentane, and 50 g of isooctane. The mixture was put in an autoclave and mixed. Thus, an oily mixture was prepared.

(Preparation of Composition 2 [Aqueous Dispersion Medium, Oily Mixture])

Composition 2 [aqueous dispersion medium, oily mixture] was obtained as in the case of Composition 1 except that the oily mixture and the aqueous dispersion medium were prepared according to the formulations shown in Table 1. (unit in Table 1: gram (g))

TABLE 1

| | | | Composition | |
|---|---|---|---|---|
| | | | 1 | 2 |
| Oily mixture | Monomer | Acrylonitrile | 160 | 525 |
| | | Methacrylonitrile | 180 | 210 |
| | | Methyl methacrylate | 160 | 9 |
| | | Methacrylic acid | 250 | 0 |
| | | Trimethylolpropane trimethacrylate | 6 | 6 |
| | Solvent | n-Pentane | 200 | 250 |
| | | Isooctane | 50 | 0 |
| | Initiator | Azobisisobutylonitrile | 10 | 10 |
| Aqueous dispersion medium | Dispersant | Deionized water | 2000 | 2000 |
| | | Colloidal silica (solid content 20 wt %) | 300 | 300 |
| | | Polyvinylpyrrolidone | 7 | 7 |
| | | Sodium chloride | 600 | 600 |
| | | Hydrochloric acid | — | 2.5 |

Example 1

(Production of Thermally Expandable Microcapsule)

The oily mixture obtained in Composition 1 was put into a tank 1, and the aqueous dispersion medium obtained in Composition 1 was put into a tank 2. To the tank 2 was added the oily mixture in the tank 1, followed by mixing. Thus, a primary dispersion was obtained.

The obtained primary dispersion was passed through a block-type static dispersion machine at a flow rate of 120 L/min. The liquid after passing was charged into an autoclave. The block-type static dispersion machine used included sheet blocks with 70 holes having a hole size of 2 mm. The number of blocks was 20.

After nitrogen purging, reaction was performed at a reaction temperature of 60° C. for 15 hours. The reaction pressure was set to 0.5 MPa, and the stirring was performed at 200 rpm.

Thereafter, 8,000 L of the resulting polymerized slurry was fed in portions to a compression dehydrator. After dehydration, a washing step was performed by feeding a predetermined amount of washing water to the dehydrator, followed by drying. Thus, thermally expandable microcapsules were obtained.

(Production of Foamable Masterbatch and Foam Molded Article)

An amount of 100 parts by weight of a base resin (low-density polyethylene), 100 parts by weight of the obtained thermally expandable microcapsules, and 10 parts by weight of a lubricant (stearic acid) were fed to a Banbury mixer and kneaded therein at 100° C. for 30 seconds. The kneaded mixture was extruded from the mixer into pellets. Thus, masterbatch pellets were obtained.

The obtained masterbatch pellets in an amount of 3 parts by weight were mixed with 100 parts by weight of an olefin-based thermoplastic vulcanizate (TPV, available from Mitsui Chemicals, Milastomer 7030BS, density 0.88 g/cm$^3$). The obtained pellet mixture was fed to a hopper of an extrusion molding machine, melt-kneaded therein, and extrusion-molded into sheet foam molded articles having different thicknesses of 0.5 mm and 3 mm. The molding temperature was set to 210° C.

Examples 2 to 5, Comparative Example 1

Thermally expandable microcapsules, a foamable masterbatch, and foam molded articles were produced as in Example 1, except that the flow rate, the block hole size, and the number of blocks in dispersion using a block-type static dispersion machine were changed as shown in Table 2.

Example 6

The oily mixture and the aqueous dispersion medium obtained in Composition 1 were fed to a tank and mixed using a homogenizer (Homomixer available from Primix corporation) at a rotation speed of 10,000 rpm for a stirring time of 10 minutes.

After nitrogen purging, reaction was performed at a reaction temperature of 60° C. for 15 hours. The reaction pressure was set to 0.5 MPa, and the stirring was performed at 200 rpm.

Thereafter, 8,000 L of the resulting polymerized slurry was fed in portions to a compression dehydrator. After dehydration, a washing step was performed by feeding a predetermined amount of washing water to the dehydrator. The washed product was then dried.

Thermally expandable microcapsules, a foamable masterbatch, and foam molded articles were produced as in Example 1, except that the classification step was subsequently performed using a wind classifier (Donaselec, available from Aisin Nano Technologies Co., Ltd.).

Example 7, Comparative Examples 2 to 6

Thermally expandable microcapsules, a foamable masterbatch, and foam molded articles were produced as in Example 6, except that the rotation speed and stirring time in dispersion using a homogenizer and the presence or absence of the classification step were changed as shown in Table 2.

Comparative Example 7

Thermally expandable microcapsules, a foamable masterbatch, and foam molded articles were produced as in Example 6, except that the classification step was performed by using a vibrating sieve classifier (vibrating sieve available from Dalton Corporation).

Comparative Examples 10 to 12

Thermally expandable microcapsules, a foamable masterbatch, and foam molded articles were produced as in Example 1, except that the flow rate, the block hole size, the number of block holes, and the number of blocks in dispersion using a block-type static dispersion machine were changed as shown in Table 2.

Example 8

Thermally expandable microcapsules were obtained as in Example 1, except that the oily mixture and the aqueous dispersion medium obtained in Composition 2, instead of Composition 1, were used.

A foamable masterbatch and foam molded articles were produced as in Example 1, except that the olefin-based thermoplastic vulcanizate was replaced with a styrene-butadiene-styrene block copolymer (SBS, TR1600 available from JSR Corporation, density 0.96 g/cm$^3$) and the molding temperature was set to 170° C.

Example 9

Thermally expandable microcapsules were obtained as in Example 6, except that the oily mixture and aqueous dispersion medium obtained in Composition 2, instead of Composition 1, were used.

A foamable masterbatch and foam molded articles were produced as in Example 1, except that the olefin-based thermoplastic vulcanizate was replaced with a styrene-butadiene-styrene block copolymer (SBS, TR1600 available from JSR Corporation, density 0.96 g/cm$^3$) and the molding temperature was set to 170° C.

Comparative Example 8

Thermally expandable microcapsules were obtained as in Comparative Example 1, except that the oily mixture and aqueous dispersion medium obtained in Composition 2, instead of Composition 1, were used.

A foamable masterbatch and foam molded articles were produced as in Comparative Example 1, except that the olefin-based thermoplastic vulcanizate was replaced with a styrene-butadiene-styrene block copolymer (SBS, TR1600 available from JSR Corporation, density 0.96 g/cm$^3$) and the molding temperature was set to 170° C.

Comparative Example 9

Thermally expandable microcapsules were obtained as in Comparative Example 7, except that the oily mixture and aqueous dispersion medium obtained in Composition 2, instead of Composition 1, were used.

A foamable masterbatch and foam molded articles were produced as in Comparative Example 7, except that the olefin-based thermoplastic vulcanizate was replaced with a styrene-butadiene-styrene block copolymer (SBS, TR1600 available from JSR Corporation, density 0.96 g/cm$^3$) and the molding temperature was set to 170° C.

(Evaluation Method)

The properties of the obtained thermally expandable microcapsules and foam molded articles were evaluated by the following methods. Table 2 shows the results.

(1) Evaluation of Thermally Expandable Microcapsules (1-1) Particle Size (D10, D50, D99) Measurement The particle sizes (D10, D50, D99) of the obtained thermally expandable microcapsules were measured based on a cumulative undersize distribution of a volume-equivalent particle size determined using a laser diffraction/scattering particle size distribution analyzer (LA-950, available from Horiba, Ltd.). Also, "D10/D50", "D99/D50", "(D99)$^3$/(D50)$^3$", and "(D99−D10)/D50" were calculated from the measured D10, D50 and D99 values.

The "average particle size" and "standard deviation of particle size distribution" were measured in the same manner as the above operation, and the "CV value" was calculated by dividing the "average particle size" by the "standard deviation of particle size distribution".

(1-2) Foaming Starting Temperature and Maximum Foaming Temperature

The foaming starting temperature (Ts) and the maximum foaming temperature (Tmax) were measured with a thermomechanical analyzer (TMA) (TMA2940, available from TA Instruments). Specifically, 25 μg of a sample was placed in an aluminum container having a diameter of 7 mm and a depth of 1 mm and heated at a temperature increase rate of 5° C./min from 80° C. to 250° C. with a force of 0.1 N applied from above. The displacement was measured in the perpendicular direction of a measuring terminal. The temperature at which the displacement began to increase was defined as the foaming starting temperature. Also, the expansion ratio was measured, and the temperature at which the expansion ratio reached the maximum was defined as the maximum foaming temperature.

(1-3) Shell Thickness Ratio

The resulting thermally expandable microcapsules were embedded in a sample embedding resin for electron microscope (Epok812 available from Okenshoji Co., Ltd.) and heated in an oven at 60° C. for 15 hours.

The resulting cured product was cut using an ultramicrotome (available from Leica Microsystems), and the obtained cross section of the particles was observed with an SEM. The shell thickness of one thermally expandable microcapsule was measured at 10 points where the shell thickness was maximum and at 10 points where the shell thickness was minimum. The ratio of their average values (minimum shell thickness/maximum shell thickness) was calculated. The same operation was performed on 10 thermally expandable microcapsules in total, and the average value of the resultant ratios was defined as the shell thickness ratio.

The intermediate shell thickness [(maximum shell thickness+minimum shell thickness)/2] was calculated from the resulting minimum shell thickness and maximum shell thickness.

(2) Evaluation of Foam Molded Article (2-1) Surface Roughness [Surface Property]

The surface roughness (Ra) of the foamed molded article was measured using a 3D measuring macroscope (VR-3000 available from Keyence Corporation).

Also, the rate of change in the surface property Ra of the molded article having a thickness of 0.5 mm with respect to the surface property Ra of the molded article having a thickness of 3 mm was taken as the surface property deterioration rate.

(2-2) Measurement of Density, Weight Reduction Rate

The density of the obtained foam molded article (post-foaming density) was measured by a method in conformity with JIS K-7112 A method (water displacement method).

Also, the percentage of the post-foaming density to the pre-foaming density was calculated as the weight reduction rate.

(2-3) Surface Unevenness of Molded Article

The entire foam molded article obtained was visually observed to determine the presence or absence of surface unevenness. A case where surface unevenness was not observed was evaluated as "○ (good)" and a case where surface unevenness was observed was evaluated as "x (poor)".

The surface roughness Ra is an actual value obtained by locally measuring the shape of the molded article, whereas the surface unevenness is evaluated by visually observing the entire surface of the molded article.

TABLE 2

| | | Examl-ple 1 | Exam-ple 2 | Exam-ple 3 | Exam-ple 4 | Exam-ple 5 | Exam-ple 6 | Exam-ple 7 | Compar-ative Exam-ple 1 |
|---|---|---|---|---|---|---|---|---|---|
| Composition No. | | 1 | 1 | 1 | 1 | 1 | 1 | 1 | 1 |
| Dispersion step | Type of dispersion machine | Block | Block | Block | Block | Block | Homo-genizer | Homo-genizer | Block |
| | Number of block holes (pcs) | 70 | 70 | 70 | 70 | 70 | — | — | 70 |
| | Block hole size (mm) | 2 | 2 | 2 | 2 | 1 | — | — | 2 |
| | Flow rate (L/min) | 120 | 100 | 120 | 150 | 120 | — | — | 30 |
| | Number of blocks (pcs) | 20 | 20 | 10 | 20 | 20 | — | — | 20 |
| | Rotation speed (rpm) | — | — | — | — | — | 10000 | 7000 | — |
| | Stirring time (min) | — | — | — | — | — | 10 | 60 | — |
| Classification step | | — | — | — | — | — | Wind | Wind | — |
| Measurement of particle size | D10 | 18.8 | 24.2 | 17.3 | 12.4 | 8.2 | 10.8 | 8.9 | 17.2 |
| | D50 | 25.1 | 33.6 | 26.2 | 16.1 | 11.2 | 16.1 | 14.3 | 33.6 |
| | D99 | 38.8 | 58.9 | 45.6 | 24.4 | 15.8 | 29.8 | 26.8 | 72.4 |
| | D10/D50 | 0.749 | 0.720 | 0.660 | 0.770 | 0.732 | 0.671 | 0.622 | 0.512 |
| | D99/D50 | 1.546 | 1.753 | 1.740 | 1.516 | 1.411 | 1.851 | 1.874 | 2.155 |
| | (D99)$^3$/(D50)$^3$3 | 3.69 | 5.39 | 5.27 | 3.48 | 2.8 | 6.34 | 6.58 | 10.00 |
| | (D99-D10)/D50 | 0.80 | 1.03 | 1.08 | 0.75 | 0.68 | 1.18 | 1.25 | 1.64 |
| CV value | | 19.2 | 36.5 | 24.2 | 15.3 | 12.5 | 19.2 | 19.6 | 38.1 |
| Intermediate shell thickness (μm) | | 4.2 | 5.6 | 4.4 | 2.7 | 1.9 | 2.7 | 2.3 | 5.6 |
| Shell thickness ratio | | 0.92 | 0.82 | 0.87 | 0.76 | 0.63 | 0.82 | 0.38 | 0.38 |
| Foaming starting temperature (Ts) | | 166 | 165 | 163 | 168 | 167 | 166 | 169 | 164 |
| Maximum foaming temperature (Tmax) | | 211 | 215 | 211 | 207 | 208 | 206 | 200 | 213 |
| Evaluation of molded article (0.5 mm thickness) | Surface property Ra (μm) | 14.69 | 20. | 16.24 | 9.04 | 8.05 | 11.7 | 10.8 | 43.5 |
| | Density (g/cm$^3$) | 0.51 | 0.48 | 0.52 | 0.55 | 0.58 | 0.55 | 0.60 | 0.64 |
| | Weight reduction rate | 41.9% | 45.3% | 41.3% | 37.3% | 33.6% | 38.0% | 31.8% | 27.7% |
| Evaluation of molded article (3 mm thickness) | Surface property Ra (μm) | 13.0 | 18.0 | 14.0 | 8.0 | 7.0 | 10.1 | 9.6 | 32.0 |
| | Density (g/cm3) | 0.55 | 0.52 | 0.55 | 0.59 | 0.63 | 0.59 | 0.62 | 0.68 |
| | Weight reduction rate | 37.5% | 41.2% | 37.5% | 33.3% | 28.6% | 33.3% | 29.5% | 23.1% |
| Surface property deterioration rate (Ra of 0.5 mm thickness/Ra of 3.0 mm thickness) | | 1.13 | 1.15 | 1.16 | 1.13 | 1.15 | 1.16 | 1.13 | 1.36 |
| Surface unevenness of molded article | | ○ | ○ | ○ | ○ | ○ | ○ | ○ | x |

| | | Compar-ative Exam-ple 2 | Compar-ative Exam-ple 3 | Compar-ative Exam-ple 4 | Compar-ative Exam-ple 5 | Compar-ative Exam-ple 6 | Compar-ative Exam-ple 7 | Compar-ative Exam-ple 10 |
|---|---|---|---|---|---|---|---|---|
| Composition No. | | 1 | 1 | 1 | 1 | 1 | 1 | 1 |
| Dispersion step | Type of dispersion machine | Homo-genizer | Homo-genizer | Homo-genizer | Homo-genizer | Homo-genizer | Homo-genizer | Block |
| | Number of block holes (pcs) | — | — | — | — | — | — | 50 |
| | Block hole size (mm) | — | — | — | — | — | — | 2 |
| | Flow rate (L/min) | — | — | — | — | — | — | 100 |
| | Number of blocks (pcs) | — | — | — | — | — | — | 20 |
| | Rotation speed (rpm) | 5000 | 5000 | 10000 | 10000 | 15000 | 10000 | — |
| | Stirring time (min) | 10 | 10 | 10 | 30 | 10 | 10 | — |
| Classification step | | — | Wind | — | — | — | Vibrating sieve | — |
| Measurement of particle size | D10 | 20.7 | 18.2 | 10.0 | 7.4 | 7.9 | 7.6 | 18.3 |
| | D50 | 39.0 | 33.4 | 16.5 | 14.1 | 12.2 | 15.3 | 35.6 |
| | D99 | 108.3 | 72.1 | 36.5 | 34.8 | 26.2 | 30 | 81.2 |
| | D10/D50 | 0.531 | 0.545 | 0.606 | 0.525 | 0.648 | 0.497 | 0.514 |
| | D99/D50 | 2.777 | 2.159 | 2.212 | 2.468 | 2.148 | 1.961 | 2.281 |
| | (D99)$^3$/(D50)$^3$3 | 21.41 | 10.06 | 10.82 | 15.03 | 9.90 | 7.54 | 11.87 |
| | (D99-D10)/D50 | 2.25 | 1.61 | 1.61 | 1.94 | 1.50 | 1.46 | 1.77 |
| CV value | | 39.9 | 30.5 | 24.1 | 22. | 19.8 | 18.2 | 40.1 |
| Intermediate shell thickness (μm) | | 6.5 | 5.6 | 2.8 | 2.4 | 2.0 | 2.6 | 6.0 |
| Shell thickness ratio | | 0.66 | 0.35 | 0.35 | 0.28 | 0.33 | 0.39 | 0.37 |
| Foaming starting temperature (Ts) | | 163 | 166 | 166 | 167 | 170 | 168 | 167 |
| Maximum foaming temperature (Tmax) | | 209 | 210 | 210 | 207 | 205 | 208 | 215 |
| Evaluation of molded article (0.5 mm thickness) | Surface property Ra (μm) | 66.3 | 66 | 34 | 25.38 | 20.48 | 13.2 | 53.3 |
| | Density (g/cm$^3$) | 0.55 | 0.58 | 0.63 | 0.68 | 0.64 | 0.67 | 0.66 |
| | Weight reduction rate | 38.0% | 33.6% | 28.5% | 22.5% | 27.7% | 23.3% | 25.0% |
| Evaluation of molded article (3 mm thickness) | Surface property Ra (μm) | 47.0 | 44.0 | 25.0 | 18.0 | 16.0 | 11.0 | 39.3 |
| | Density (g/cm3) | 0.59 | 0.63 | 0.68 | 0.73 | 0.68 | 0.73 | 0.68 |
| | Weight reduction rate | 33.3% | 28.6% | 23.1% | 16.7% | 23.1% | 16.7% | 23.1% |

TABLE 2-continued

| | | | | | | | |
|---|---|---|---|---|---|---|---|
| Surface property deterioration rate (Ra of 0.5 mm thickness/Ra of 3.0 mm thickness) | 1.41 | 1.5 | 1.36 | 1.4 | 1.28 | 1.2 | 1.36 |
| Surface unevenness of molded article | x | x | x | x | x | x | x |

| | | Comparative Example 11 | Comparative Example 12 | Example 8 | Example 9 | Comparative Example8 | Comparative Example 9 |
|---|---|---|---|---|---|---|---|
| Composition No. | | 1 | 1 | 2 | 2 | 2 | 2 |
| Dispersion step | Type of dispersion machine | Block | Block | Block | Homogenizer | Block | Homogenizer |
| | Number of block holes (pcs) | 70 | 70 | 70 | — | 70 | — |
| | Block hole size (mm) | 4 | 2 | 2 | — | 2 | — |
| | Flow rate (L/min) | 120 | 120 | 120 | — | 30 | — |
| | Number of blocks (pcs) | 20 | 6 | 20 | — | 20 | — |
| | Rotation speed (rpm) | — | — | — | 10000 | — | 10000 |
| | Stirring time (min) | — | — | — | 10 | — | 10 |
| Classification step | | — | — | — | Wind | — | Vibrating sieve |
| Measurement of particle size | D10 | 21.1 | 33 | 19.1 | 11.0 | 17.4 | 7.5 |
| | D50 | 33 | 39 | 26.7 | 15.5 | 35.3 | 16.1 |
| | D99 | 76.2 | 81.2 | 43.8 | 28.8 | 76.5 | 32.1 |
| | D10/D50 | 0.639 | 0.846 | 0.715 | 0.710 | 0.493 | 0.466 |
| | D99/D50 | 2.309 | 2.082 | 1.640 | 1.858 | 2.167 | 1.994 |
| | $(D99)^3/(D50)^3$3 | 12.31 | 9.03 | 4.41 | 6.4 | 10.18 | 7.93 |
| | (D99-D10)/D50 | 1.67 | 1.24 | 0.93 | 1.15 | 1.67 | 1.53 |
| CV value | | 36.9 | 44.5 | 22.1 | 23.1 | 36.8 | 18.9 |
| Intermediate shell thickness (μm) | | 5.5 | 6.5 | 4.5 | 2.6 | 5.9 | 2.7 |
| Shell thickness ratio | | 0.47 | 0.37 | 0.52 | 0.63 | 0.48 | 0.37 |
| Foaming starting temperature (Ts) | | 165 | 167 | 126 | 129 | 122 | 128 |
| Maximum foaming temperature (Tmax) | | 212 | 208 | 168 | 164 | 170 | 166 |
| Evaluation of molded article (0.5 mm thickness) | Surface property Ra (μm) | 52.0 | 48.0 | 15.82 | 8.96 | 25 | 12.7 |
| | Density (g/cm$^3$) | 0.59 | 0.58 | 0.46 | 0.51 | 0.54 | 0.58 |
| | Weight reduction rate | 33.0% | 34.1% | 51.8% | 47.0% | 43.7% | 39.9% |
| Evaluation of molded article (3 mm thickness) | Surface property Ra (μm) | 35.6 | 32.1 | 14.0 | 8.0 | 20.0 | 10.0 |
| | Density (g/cm3) | 0.59 | 0.62 | 0.49 | 0.55 | 0.59 | 0.63 |
| | Weight reduction rate | 33.0% | 29.5% | 48.8% | 42.4% | 38.8% | 34.7% |
| Surface property deterioration rate (Ra of 0.5 mm thickness/Ra of 3.0 mm thickness) | | 1.46 | 1.50 | 1.13 | 1.12 | 1.25 | 1.27 |
| Surface unevenness of molded article | | x | x | ○ | ○ | x | x |

INDUSTRIAL APPLICABILITY

The present invention can provide a thermally expandable microcapsule from which a foam molded article that has a uniform surface, is less prone to surface unevenness, and has an excellently light weight can be produced.

The present invention can also provide a foamable masterbatch and a foam molded article each produced using the thermally expandable microcapsule.

The invention claimed is:

1. A thermally expandable microcapsule comprising:

a shell; and a volatile expansion agent as a core agent encapsulated by the shell, the thermally expandable microcapsule satisfying D10/D50 of 0.6 or more and 1.0 or less and D99/D50 of 1.0 or more and 2.0 or less where D10 represents a particle size at a cumulative frequency of 10% by volume, D50 represents a particle size at a cumulative frequency of 50% by volume, and D99 represents a particle size at a cumulative frequency of 99% by volume in a cumulative undersize distribution of a volume-equivalent particle size determined using a laser diffraction/scattering particle size distribution analyzer.

2. The thermally expandable microcapsule according to claim 1, wherein a volumetric ratio of D99 to D50 [$(D99)^3/(D50)^3$] is 1.0 or more and 8.0 or less.

3. The thermally expandable microcapsule according to claim 1, wherein a value obtained by dividing a difference between D99 and D10 by D50 [(D99−D10)/D50] is 0 or more and 1.4 or less.

4. The thermally expandable microcapsule according to claim 1, wherein D99 is 15 μm or larger and 80 μm or smaller.

5. The thermally expandable microcapsule according to claim 1, wherein the shell contains a polymer of a monomer composition containing a nitrile monomer.

6. The thermally expandable microcapsule according to claim 1, wherein a shell thickness ratio (minimum shell thickness/maximum shell thickness) is 0.4 or more.

7. A foamable masterbatch comprising:

the thermally expandable microcapsule according to claim 1; and a thermoplastic resin.

8. A foam molded article produced using the thermally expandable microcapsule according to claim 1, or a foamable masterbatch comprising the thermally expandable microcapsule according to claim 1 and a thermoplastic resin.

* * * * *